United States Patent Office.

TRAUGOTT SANDMEYER, OF BASLE, SWITZERLAND, ASSIGNOR, BY MESNE ASSIGNMENTS, TO THE FARBENFABRIKEN, VORMALS FR. BAYER & CO., OF ELBERFELD, PRUSSIA, AND THE ACTIEN-GESELLSCHAFT FÜR ANILIN FABRIKATION, OF BERLIN, GERMANY.

RED COLOR.

SPECIFICATION forming part of Letters Patent No. 406,669, dated July 9, 1889.

Application filed October 24, 1888. Serial No. 289,073. (Specimens.)

*To all whom it may concern:*

Be it known that I, TRAUGOTT SANDMEYER, of Basle, Switzerland, have invented a certain new and useful Process for the Production of Red to Violet Colors Dyeing Cotton without Mordants, of which the following is a specification.

This invention has reference to the production of new colors, and is based upon the discovery that unsymmetric substituted azoxy and azo compounds are obtained by condensation of substituted aromatic amines with aromatic nitro substances, or by condensation of substituted aromatic nitro substances with aromatic amines, by heating them with caustic alkalies. The new base is like sirup. Its nitrate and chloride easily crystallize. The sulphate is scarcely soluble in water. The product thus obtained has to be reduced, then treated with acid to be diazotized, and to be combined with one or two of the following substances: alpha or beta naphthylamine, alpha or beta naphthylamine sulpho-acids, alpha or beta naphthol, or alpha or beta naphthol sulpho-acids.

To carry out the invention I boil, for instance, ten kilos of ortho-toluidine with ten kilos of caustic soda under gradual addition of ten kilos of nitro-benzine until the latter has completely disappeared. A red-brown paste is the result, which has to be reduced with zinc powder after having been diluted with water. I let it stand until it is cold, pour it into concentrated muriatic acid, boil, dilute with water, and filter. Then I add Glauber's salt to precipitate the sulphate in form of a paste. One hundred kilos of it, containing twenty per cent. dry substance, are mixed with eighteen kilos of muriatic acid, cooled with ice, and diazotized by addition of nine and one-half kilos of nitrite of sodium. The solution of the diazo compound is poured in a solution of ten kilos of soda and forty-five kilos of naphthionate of sodium or the corresponding quantity of another of the above-named substances. When the color is formed, I heat and precipitate with salt.

To produce colors of mixed composition I pour the solution of the diazo compound in a solution of ten kilos of soda with, for instance, twenty kilos of naphthionate. When the combination is finished, I add ten kilos of naphthol and four kilos of caustic soda or the corresponding quantity of another of the above-named substances.

Having thus described my invention, what I claim as new, and desire to secure by Letters Patent, is—

The herein-described process for the production of red to violet colors by first boiling ortho-toluidine with caustic soda and gradually adding thereto nitro-benzine; the product is then reduced by means of zinc powder, then allowed to stand until cold; it is then poured into concentrated muriatic acid, boiled, and diluted with water, then filtered, after which I add Glauber's salt and mix it with muriatic acid cooled and diazotized by nitrite of sodium; the final product is poured into a solution of soda and naphthionate of sodium, the whole heated and precipitated with salt, substantially as described.

In testimony whereof I hereunto sign my name, in the presence of two subscribing witnesses, this 25th day of September, 1888.

TRAUGOTT SANDMEYER.

Witnesses:
 GEORGE GIFFORD,
 CHARLES A. RICHTER.